(12) United States Patent
Katz et al.

(10) Patent No.: US 10,191,561 B2
(45) Date of Patent: Jan. 29, 2019

(54) TRACKING CONTROLLERS OF A VIRTUAL REALITY SYSTEM

(71) Applicant: Facebook Technologies, LLC, Menlo Park, CA (US)

(72) Inventors: Dov Katz, Irvine, CA (US); Neil Konzen, Hunts Point, WA (US); Oskar Linde, Belmont, CA (US); Maksym Katsev, Los Altos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 14/814,467

(22) Filed: Jul. 30, 2015

(65) Prior Publication Data

US 2016/0364013 A1 Dec. 15, 2016

Related U.S. Application Data

(60) Provisional application No. 62/175,952, filed on Jun. 15, 2015.

(51) Int. Cl.
*G06F 3/03* (2006.01)
*G06F 3/0346* (2013.01)
*G06F 1/16* (2006.01)
*G06F 3/01* (2006.01)

(52) U.S. Cl.
CPC .......... *G06F 3/0304* (2013.01); *G06F 1/1694* (2013.01); *G06F 3/011* (2013.01); *G06F 3/0346* (2013.01)

(58) Field of Classification Search
CPC ...... A63F 13/212; H04M 1/0264; G06T 1/00; H04N 7/18
See application file for complete search history.

(56) References Cited

U.S. PATENT DOCUMENTS

| 2013/0271602 | A1* | 10/2013 | Bentley | ................... H04N 7/18 348/143 |
| 2013/0295994 | A1* | 11/2013 | Guitteaud | .............. F16M 13/00 455/556.1 |
| 2014/0176580 | A1* | 6/2014 | Brown | ................... H04N 13/00 345/520 |
| 2015/0352437 | A1* | 12/2015 | Koseki | ................. A63F 13/212 463/31 |

* cited by examiner

*Primary Examiner* — Lun-Yi Lao
*Assistant Examiner* — Johny Lau
(74) *Attorney, Agent, or Firm* — Fenwick & West LLP

(57) ABSTRACT

A virtual reality (VR) system tracks the position of a controller. The VR system includes an image tracking system comprising of a number of fixed cameras, and a headset worn by the user that includes an imaging device to capture images of a controller operated by the user. The controller includes a set of features disposed on the surface of the controller. The image tracking system provides a first view of the controller. The imaging device mounted on the headset provides a second view of the controller. Each view of the controller (i.e., from the headset and from the image tracking system) provides a distinct set of features observed on the controller. The first and second sets of features are identified from the captured images and a pose of the controller is determined using the first set of features and the second set of features.

16 Claims, 4 Drawing Sheets

TRACKING CONTROLLERS OF A VIRTUAL REALITY SYSTEM

CROSS REFERENCE TO RELATED APPLICATIONS

This application claims the benefit of U.S. Provisional Application No. 62/175,952, filed Jun. 15, 2015, which is incorporated herein by reference in its entirety.

BACKGROUND

The present disclosure generally relates to virtual reality systems, and more specifically relates to tracking of controllers for virtual reality systems.

Virtual reality (VR) systems typically generate and simulate a virtual world for a user. These VR systems may include various components, such as a headset and controller to provide information to a user and receive a user's input to the VR system. To improve the realism of the virtual world, the VR system may track the user's body position and movement. In particular, the VR system may track the movement of a controller associated with the VR system, such as its position and orientation in space.

SUMMARY

A virtual reality (VR) system tracks movement of a controller using at least two cameras that capture the controller from more than one perspective. The VR system includes a camera mounted on a headset worn by the user, as well as a camera positioned away from the user and directed towards the user and the controller. The VR system includes a headset, an image tracking system, a console, and a controller. The image tracking system includes a set of fixed cameras to image the headset worn by a user and the controller operated by the user. The headset includes an imaging device (camera) configured to capture images including the controller. Thus, the image tracking system provides a first view of the controller from a distance away from the user's location. The camera mounted on the headset provides a second view of the controller from the location of the user, providing an image of the controller from the location of the user (i.e., the user's perspective). The console generates a virtual world and identifies the location and orientation of the controller based on the first and second views provided by the headset and the image tracking system. By using the first and second views, the console may determine the position of the controller with greater confidence than when a single camera is used.

In one embodiment, the controller includes a set of detectors disposed on the surface of the controller that may be easily detected by the cameras. In one example, the detectors include lights, such as light-emitting diodes (LEDs), located on the surface of the controller. The detectors may be disposed on the controller such that each orientation of the controller provides a different view of the detectors. In this embodiment, each view of the controller (i.e., from the headset and from the image tracking system) provides a distinct set and orientation of detectors on the controller shown by an image taken from that view. These different views of the features may be used to improve detection of the controller orientation.

Additionally, the camera mounted to the headset provides a possible backup imaging of the controller when the controller is occluded from the fixed cameras. The console receives the images from the different imaging devices and determines a position and movement of the controller within the virtual mapping of the local area. Based at least in part on the determined position and movement of the controller within the virtual mapping of the local area, the console generates video information that is provided to the headset for presentation by the electronic display.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
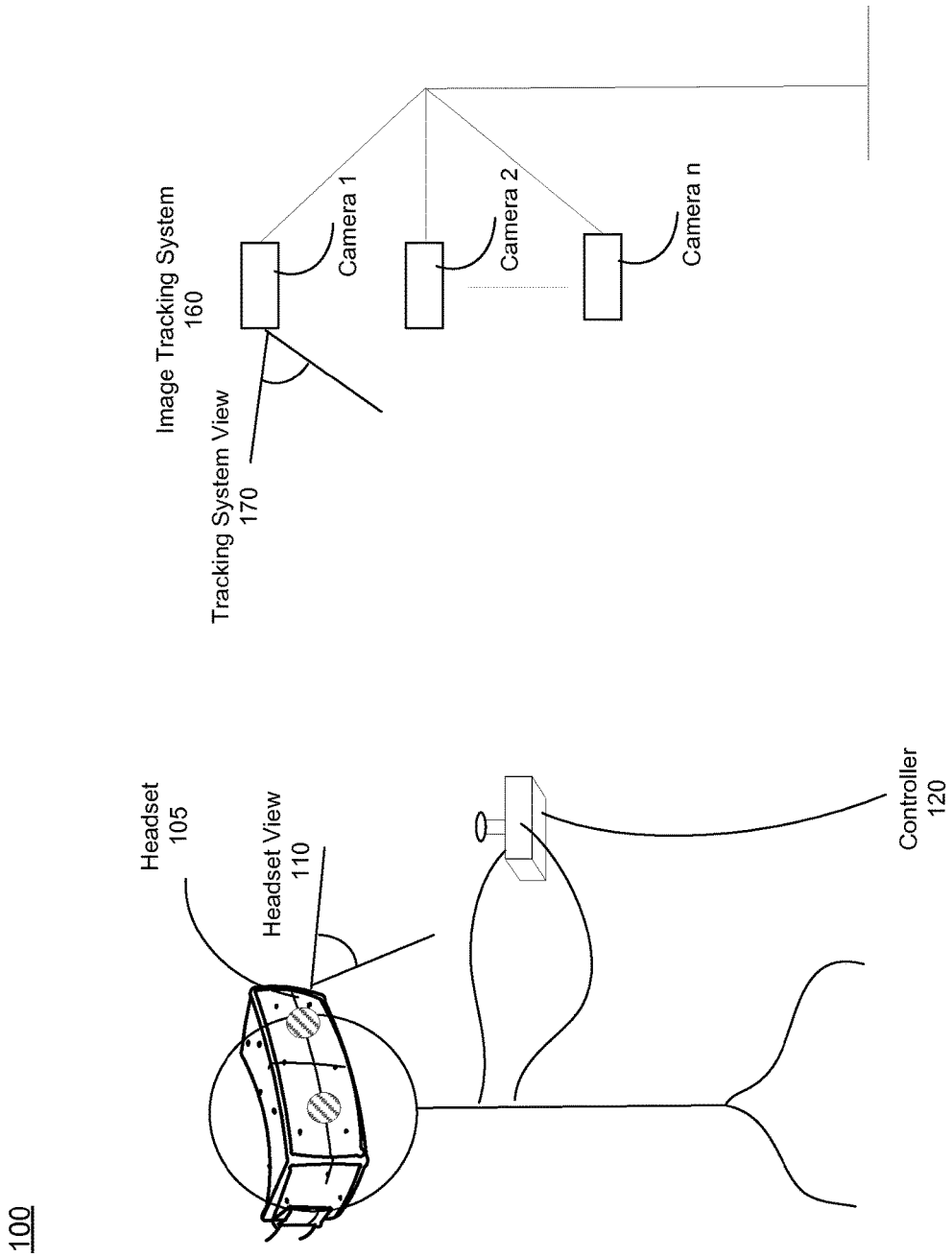
FIG. 1 is an example of a system environment including a virtual reality system and a user using the virtual reality headset and the controller, in accordance with an embodiment.

FIG. 1 is an example of a system environment 100 for tracking movement of a controller 120 according to an embodiment. The system environment 100 includes a user using a headset 105 and the controller 120, and an image tracking system 160. As the user uses the controller 120, the user may move the controller 120 through space in front of the user's body, rotate the controller 120, and rotate the user's body. The movement of the controller 120 as the user performs these motions is captured by imaging devices (e.g., cameras) on the headset 105 and on the image tracking system 160. The imaging device(s) on the headset 105 capture a view of the controller 120 from a headset view 110 showing the controller 120 from the user's perspective, while the imaging devices on the image tracking system 160 capture a view of the controller 120 from a tracking system view 170 showing the controller 120 from the perspective of the image tracking system 160. In this way, views of the controller 120 are captured from multiple different perspectives, and as the image tracking system 160 is typically apart from the user, the views provided of the controller by the headset view 110 and the tracking system view 170 will typically substantially differ in the angle of view to the controller 120, providing different perspectives on the controller 120's location and rotation, such as by providing opposite or orthogonal views of the controller 120. A console (not shown in FIG. 1) receives the captured images from the headset view 110 and the tracking system view 170 and calculates the pose of the controller 120. As used herein, the "pose" of the controller 120 refers to its location and rotational orientation.

The image tracking system 160 may include multiple cameras (camera 1 . . . camera n) that are mounted on the image tracking system 160, such as on arms extending from a platform of the image tracking system 160. The distance from the controller or the headset to the image tracking system 160 may be a fixed distance or may vary as the user moves with the controller 120. Thus, the image tracking system 160 provides a first view (e.g., the tracking system view 170) of the controller from a distance away from the user's location. An imaging device on the headset provides a second view (e.g., the headset view 110) of the controller from the location of the user.

Figure 2:
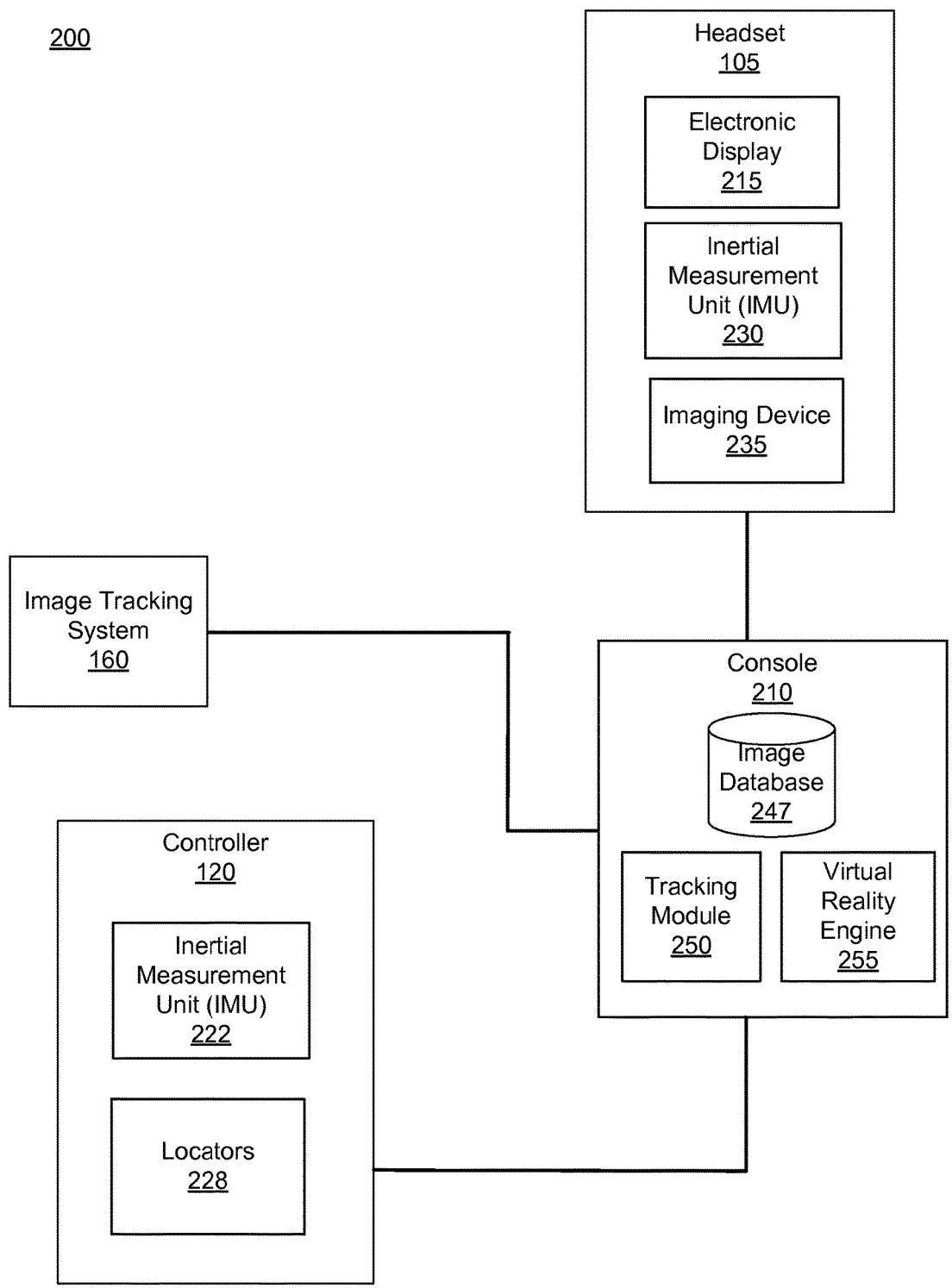
FIG. 2 is a block diagram of a system environment including a virtual reality system, in accordance with an embodiment.

FIG. 2 is a block diagram of a virtual reality system environment 200 in which a console 210 operates. The system environment 200 shown by FIG. 2 includes a headset 105, a controller 120 and an image tracking system 160 that are each coupled to the console 210. While FIG. 2 shows an example system 200 including one headset 105, one controller 120, and one image tracking system 160, in other embodiments any number of these components may be included in the system environment 200. For example, there may be multiple image tracking systems 160 that capture images from different positions of the controller 120 and the headset 105. In alternative configurations, different and/or additional components may be included in the system environment 200.

The image tracking system 160 includes one or more cameras or any other device capable of capturing images of the controller and the local area. These cameras may be configured in a variety of ways, such as mounted on a stand, which may include one or more stationary or movable arms. The cameras capture one or more images of the local area including the headset 105 and the controller 120. The cameras are typically placed in a direction facing the front of the controller 120 and the headset 105. The cameras may be placed at a generally known (e.g., within 5-10 feet) or an unknown distance from the controller or the headset.

The image tracking system 160 may include one or more filters (e.g., for increasing signal to noise ratio). In various embodiments, the images captured by the image tracking system 160 are communicated to the console 210. The images may include at least a partial view of the controller 120. Additionally, the image tracking system 160 may receive one or more calibration parameters from the console 210 to adjust one or more imaging parameters (e.g., focal length, focus, frame rate, ISO, sensor temperature, shutter speed, aperture, etc.) for capturing images of the local area.

The headset 105 is a head-mounted display that presents media to a user. Examples of media presented by the headset 105 include one or more images, video, audio, or some combination thereof. In some embodiments, audio is presented via an external device (e.g., speakers and/or headphones) that receives audio information from the headset 105, the console 210, or both, and presents audio data based on the audio information. An embodiment of the headset 105 is further described below in conjunction with FIG. 3.

The headset 105 includes an electronic display 215, an inertial measurement unit (IMU) 230 and an imaging device 235. The electronic display 215 displays images to the user in accordance with data received from the console 210. In various embodiments, the electronic display 215 may comprise a single electronic display or multiple electronic displays (e.g., a display for each eye of a user). The IMU 230 is an electronic device that generates IMU data indicating an estimated position of the headset 105 relative to an initial position of the headset 105 based on measurement signals received from one or more sensors. A sensor generates one or more measurement signals in response to motion of the headset 105. Examples of sensors include: one or more accelerometers, one or more gyroscopes, one or more magnetometers, another suitable type of sensor that detects motion, a type of sensor used for error correction of the IMU 230, or some combination thereof. The sensors may be located external to the IMU 230, internal to the IMU 230, or some combination thereof.

Based on the one or more measurement signals generated by the one or more sensors, the IMU 230 generates IMU data indicating estimated movement of the headset 105 relative to an initial position of the headset 105. For example, the sensors may include multiple accelerometers to measure translational motion (forward/back, up/down, left/right) and multiple gyroscopes to measure rotational motion (e.g., pitch, yaw, roll). In some embodiments, the IMU 230 rapidly samples the measurement signals from various sensors and calculates the estimated inertial movement of the headset 105 from the sampled data. For example, the IMU 230 integrates the measurement signals received from one or more accelerometers over time to estimate a velocity vector and integrates the velocity vector over time to determine an estimated movement of the headset 105. Alternatively, the IMU 230 provides the sampled measurement signals to the console 210, which determines the IMU data. The IMU may describe the position of the headset 105 with respect to a reference point. While the reference point may generally be defined as a point in space; however, in practice the reference point is defined as a point within the headset 105 (e.g., a center of the IMU 230).

The IMU 230 receives one or more calibration parameters from the VR console 210. As further discussed below, the one or more calibration parameters are used to maintain tracking of the headset 105. Based on a received calibration parameter, the IMU 230 may adjust one or more IMU parameters (e.g., sample rate). In some embodiments, certain calibration parameters cause the IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 235 captures one or more images of the local area including the headset 105. In various embodiments, the imaging device 235 may include one or more cameras or other device capable of capturing images of the controller 120. In various embodiments, the images captured by the imaging device 235 are communicated from the imaging device 235 to the console 210; the imaging device 235 receives one or more calibration parameters from the console 210 to adjust one or more imaging parameters (e.g., focal length, focus, frame rate, ISO, sensor temperature, shutter speed, aperture, etc.) for capturing images of the controller 120.

The controller 120 includes various sensors to provide control inputs to the console 210. The control inputs may include various buttons, control sticks, touch screen, position sensors, and so forth for control of the console 210 or an application of the console 210.

The controller 120 may also include an IMU 222 that captures IMU data indicating an estimated position of the controller relative to an initial position of the controller 120, and provides the IMU data to the console 210. The data for IMU 222 may be captured similarly to the IMU data described above with respect to IMU 230. The IMU 222 receives one or more calibration parameters from the console 210. As further discussed below, the one or more calibration parameters are used to maintain tracking of the controller 140.

Additionally, the controller 120 may include a set of locators 228 disposed on the surface of the controller 120 that may be easily detected by imaging devices and distinguished from other features captured by the imaging devices. A locator is an object located in a specific position on the controller 120 relative to one or more components, such as another locator, of the controller 120. In one example, the locators 228 include light emitting diodes (LEDs) located on the surface of the controller 120. In one embodiment, the LEDs emit light in a portion of the spectrum that is not normally present in a room, such as infrared or ultraviolet light. In another embodiment, the detectors are a contrasting color of a portion of the external surface of the controller 120. The locators 228 may be disposed on the controller 120 in various patterns, such that each side or orientation of the controller 120 may present a different orientation of the locators 228. In this way, different views of the locators 228 are captured by the image tracking system 160 and the imaging device 235 of the headset 105.

The console 210 provides content to the headset 105 for presentation to the user. In the example shown in FIG. 1, the console 210 includes a tracking module 150 and a virtual reality engine 255. Some embodiments of the console 210 have different components than those described in conjunction with FIG. 1. Similarly, the functions further described below may be distributed among components of the console 210 in a different manner than is described here. The console 210 determines the pose of the controller 120 using the images provided by the headset 105 and the image tracking system 160, as well as the position and inertial data provided by the controller inertial measurement unit 222.

The image database 247 stores the images received from the image tracking system, the headset 105 and the IMU data received from the controller 120. The image database 247 may also store a prior pose of the controller.

The tracking module 150 calibrates the system environment 100 using one or more calibration parameters and may adjust one or more calibration parameters to reduce error in determination of the position of the controller 120. For example, the tracking module 150 adjusts the focus of the imaging device 235 to obtain a more accurate position for observed images. Moreover, calibration performed by the tracking module 150 also accounts for information received from the IMU 230 in the headset 105 and/or the controller 120. Additionally, if tracking of the headset 105 and/or the controller 120 is lost (e.g., the imaging device 235 loses line of sight of the controller 120), the tracking module 150 may re-calibrate some or the entire system environment 100.

The tracking module 150 tracks movements of the headset 105 and/or the controller 120 using IMU information from images received from the headset 105 and the image tracking system 160. For example, the tracking module 150 determines a position of the controller 120. To determine this position, the tracking module 250 analyzes the images received from the headset 105 and the image tracking system 160 to identify features of the images that correspond to the locators 228 on the controller 120. For example, the tracking module 250 may identify bright points of light that correspond to LED-type locators 228 on the controller 120. The tracking module 250 then analyzes the detected features relative to known positions of the controller 120. In one embodiment, the tracking module 250 maintains a virtual model of the controller 120 and the locators 228. The tracking module 250 may determine the location at which features representing the locators 228 appear in a view of the controller from a plurality of poses of the virtual model. These locations may be pre-computed and stored in a database, or may be calculated during tracking. The view from which the virtual model is analyzed may be the view from the location of the image tracking system 160 or the headset 105.

To determine the location of the controller 120, the tracking module 250 compares the features identified from the image provided by the image tracking system 160 and the headset 105 to the plurality of views of the virtual model to identify which of the plurality of views may be the position of the controller. By identifying the features of the images that correspond to locators 228 of the controller 120, the tracking module 250 may compare the image of the controller 120 with features associated with poses of the virtual model. Because the image tracking system 160 and the headset 105 provide images of the controller 120 from different locations, the tracking module 250 may identify a pose of the controller 120 that is consistent with the identified pose from the image tracking system 160 and the headset 105.

In one embodiment, the tracking module 250 further uses the inertial measurement information from the controller 120 to prune the possible poses of the controller 120 and identify candidate poses of the controller 120. That is, the tracking module 250 may exclude those poses that are not consistent with the position and rotation of the controller as determined by the inertial information. In addition, the tracking module 250 may retrieve a prior determined position of the controller to further prune the candidate positions of the controller to those that would be consistent with the prior position.

In another example, the tracking module 150 may use a change in features in the images to determine the change in position of the controller. To perform this comparison, the tracking module 150 compares the position of the identified features (e.g., identified LEDs) on a first image of the first view to the position of the constellation of locators on the second image of the first view to determine an estimated position change based on change in location of the features. Similarly it can determine an estimated position of the controller based on one or more images of the second view. Alternatively, it can combine the images of the first and second view of the controller, and determine a position change of the controller based on the LEDs, for example, the controller may be shifted to the right and up, or left and down, and so forth.

In another embodiment, if the image data from the image tracking system 160 is lost or no longer includes a view of the controller 120, the tracking module 150 tracks movements of the headset 105 and/or the controller 120 using the IMU information and images received from the headset. For example, the user may turn away from the image tracking system, thus occluding the controller from the image tracking system 160. In such a scenario, the tracking module 150 continues to determine the position of the controller 120 based on the images received from the headset 105 to identify features of the images that correspond to the locators 228 on the controller 120. Similarly, if the image data from the imaging device on the headset is lost, the position of the controller is determined by the tracking module 150 based on the image information received from the image tracking system 160. In case the user is occluded from both, i.e. the imaging device on the headset and the image tracking system 160, the tracking module may continue to track the position of the controller based on the IMU data from the controller 120 and the headset 105.

Thus, based on the IMU data and the prior pose of the controller, a set of candidate positions for the controller 120 are determined. The tracking module identifies the location of the controller 120 by determining which candidate pose is consistent with the images received from the headset 105 and the image tracking system 160.

The VR engine 155 executes applications within the system environment 100 and receives position information, acceleration information, velocity information, predicted future positions, or some combination thereof, of the headset 105 from the tracking module 150. Based on the received information, the VR engine 155 determines content to provide to the headset 105 for presentation to the user. For example, if the received information indicates that the user has looked to the left, the VR engine 155 generates content for the headset 105 that mirrors the user's movement in a virtual environment. Additionally, the VR engine 155 performs an action within an application executing on the console 210 in response to an input received from the controller 120 and provides feedback to the user that the action was performed. The provided feedback may be visual or audible feedback via the headset 105 or haptic feedback via the controller 120.

Figure 3:
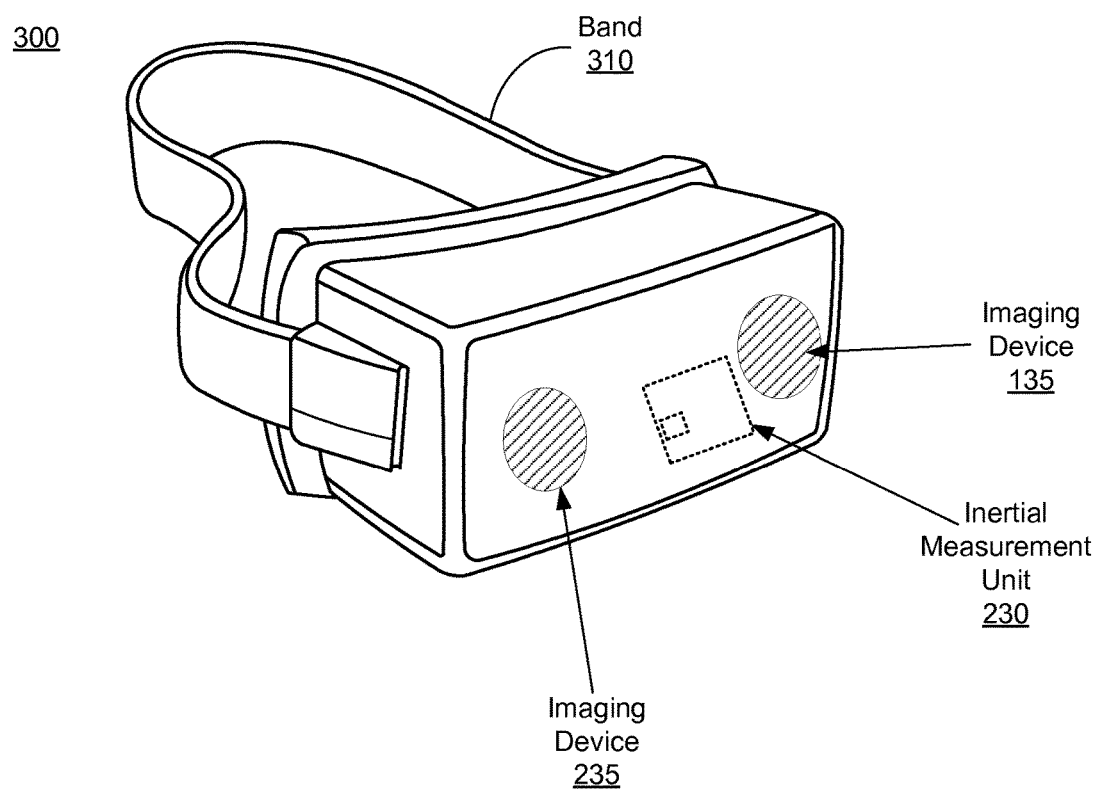
FIG. 3 is a wire diagram of a virtual reality headset, in accordance with an embodiment.

FIG. 3 is a wire diagram of a headset 300, in accordance with an embodiment. The headset 200 is an embodiment of the headset 105 including one or more electronic display elements of the electronic display 215 (not shown), the IMU 230, and the imaging device 235. In some embodiments, the imaging device 235 includes is two different cameras, so separated images produced by the two cameras are used to determine distance from the headset 200 to a controller 120 by both cameras. In alternate embodiments, the imaging device 235 is a single camera that includes a range finder for determining distance to a controller 120 being imaged.

Figure 4:
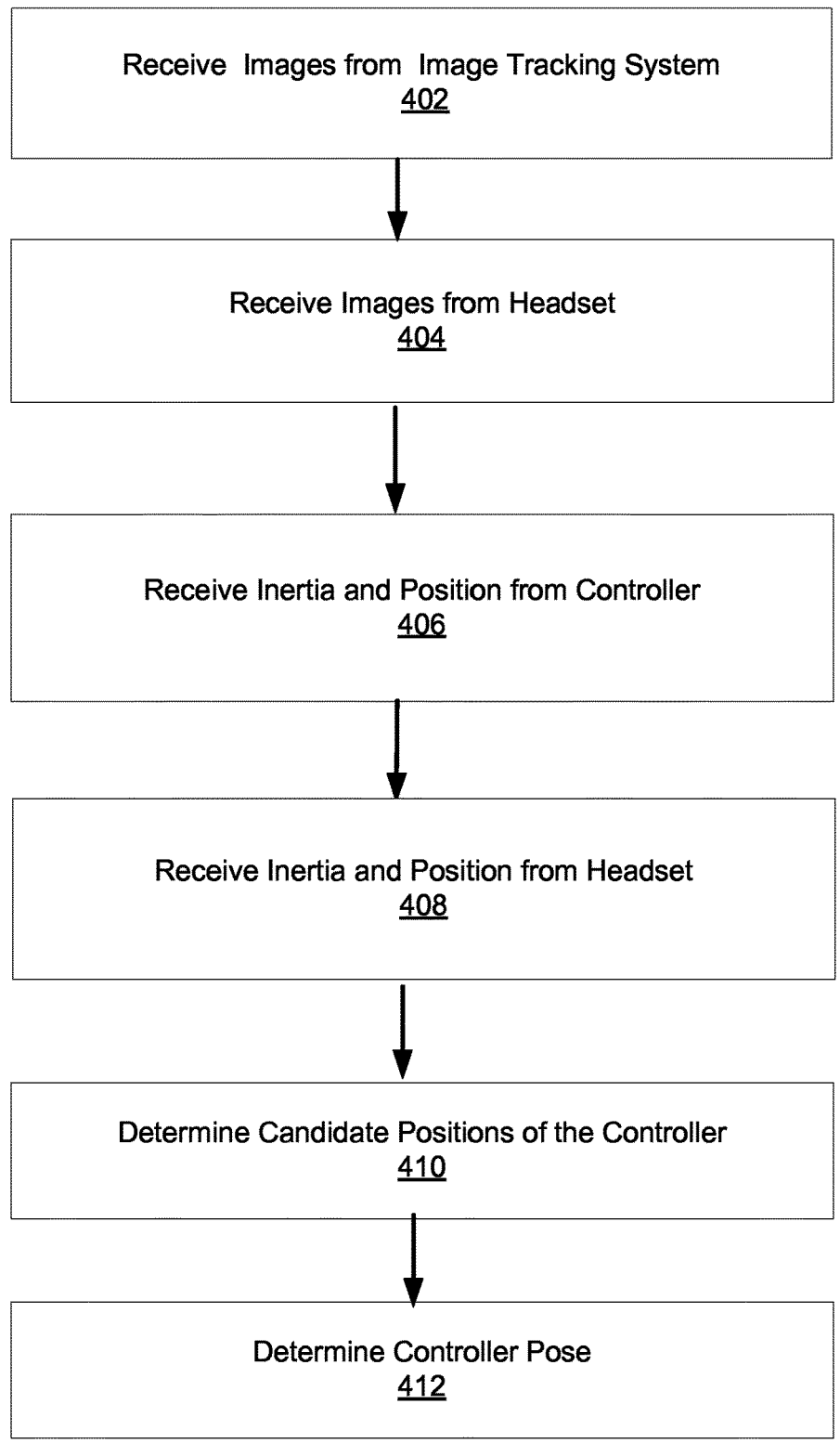
FIG. 4 is a flowchart for determining an accurate position of a controller of a virtual reality headset user, in accordance with an embodiment.

FIG. 4 is a flowchart for determining a position of a controller, in accordance with an embodiment. The console 210 receives 402 an image from the image tracking system 160. The image includes a first view (e.g., a side view or a front view) of the controller. The image includes a view of the locators 228 on the controller that may be identified as features in the image that allow tracking of the position of the controller. The console 210 further receives 404 an image from the imaging device on the headset 105. The image includes a second view (e.g. a back view or a side view) of the controller.

The console 210 further receives 406 IMU data from the IMU on the controller. The IMU data indicates an estimated movement of the controller from its previous position based on measurement signals from sensors. The console 210 further receives 408 IMU data from the IMU on the headset. The IMU data indicates an estimated movement of the headset from its previous position based on measurement signals from sensors. The IMU data from the IMU on the headset and the controller may be used to estimate a position of the controller. A set of candidate positions are determined 410 from the prior pose of the controller and IMU data from the controller 120.

The IMU data from the IMU of the controller and the headset indicate an estimated movement of the headset from its previous position. The positions of the controller and the features identified in the image are compared with other images of the one or more images of the first view or the second view of the controller. The calibration data is combined with the first view and second view images (possibly providing a full 360 degrees view) of the controller, and the compared positions of the locators 228 on the controller to determine 312 an accurate position and movement of the controller.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A method comprising:
   receiving a first real-world image captured by an image tracking system remote to a user, the first real-world image including a first real-world view of a controller held by a user from a first perspective;
   receiving a second real-world image captured by an imaging device located on a virtual reality (VR) headset worn by the user, the VR headset displaying a virtual environment to the user, the second real-world image captured at substantially the same time as the first real-world image, the second real-world image including a second real-world view of the controller from a second perspective different from the first perspective;
   identifying a first set of features of the controller in the first real-world image, the first set of features representing locators on the controller depicted in the first real-world image;
   identifying a second set of features of the controller in the second real-world image, the second set of features representing locators on the controller depicted in the second real-world image;
   determining a pose of the controller using the first set of features and the second set of features, the pose specifying a location of the controller and further specifying a rotational orientation of the controller, wherein determining the pose of the controller comprises:
   identifying a plurality of candidate poses of a virtual model of the controller,
   performing a first set of comparisons between the first set of features in the first real-world image with each of a first plurality of virtual feature sets, each of the first plurality of virtual feature sets associated with one of the candidate poses from the first perspective,
   performing a second set of comparisons between the second set of features in the second real-world image with each of a second plurality of virtual feature sets, each of the second plurality of virtual feature sets associated with one of the candidate poses from the second perspective,
   identifying, based on both the first set of comparisons and the second set of comparisons, one of the plurality of candidate poses of the virtual model as being consistent with both the first set of features in the first real-world image and the second set of features in the second real-world image, and
   determining that the pose of the controller is the identified candidate pose of the virtual model; and responsive to determining the pose of the controller, performing an action within the virtual environment to update a position and orientation of a virtual object in the virtual environment controlled by the determined pose of the controller.

2. The method of claim 1, further comprising:
receiving, from an inertial measurement unit (IMU) within the controller, IMU data that includes estimated movement of the controller from its previous position; and
wherein determining the pose of the controller further comprises:
   determining a real-world location of the controller and a real-world rotational orientation of the controller based on the IMU data,
   accessing a plurality of possible poses of the virtual model of the controller, and
   before identifying the plurality of candidate poses, determining that one of the plurality of possible poses is inconsistent with both the real-world location of the controller and the real-world rotational orientation of the controller,
   wherein the inconsistent pose is excluded from being identified as one of the plurality of candidate poses of the virtual model.

3. The method of claim 1, further comprising receiving, from an inertial measurement unit (IMU) within the headset, IMU data that includes estimated movement of the headset from its previous position.

4. The method of claim 1, further comprising retrieving, from an image database, a set of candidate positions of the controller based on the set of features of the controller in the first view and the second view.

5. The method of claim 1, further comprising integrating a velocity vector over time to determine an estimated position of a reference point on at least one of the headset or controller.

6. The method of claim 1, further comprising storing the determined position and movement of the controller along with its associated IMU data in an image database.

7. The method of claim 1, wherein the image tracking system includes one or more cameras, each camera mounted on an arm.

8. The method of claim 1, wherein one or more calibration parameters of the image tracking system, the imaging device on the headset, the IMU on the controller, or the IMU on the headset are adjusted to reduce error in determination of the position of the controller.

9. A non-transitory computer-readable medium storing instructions for execution on a processor, the instructions when executed by the processor causing the processor to perform steps comprising:
receiving a first real-world image captured by an image tracking system remote to a user, the first real-world image including a first real-world view of a controller held by a user from a first perspective;
receiving a second real-world image captured by an imaging device located on a virtual reality (VR) headset worn by the user, the VR headset displaying a virtual environment to the user, the second real-world image captured at substantially the same time as the first real-world image, the second real-world image including a second real-world view of the controller from a second perspective different from the first perspective;
identifying a first set of features of the controller in the first real-world image, the first set of features representing locators on the controller depicted in the first real-world image;
identifying a second set of features of the controller in the second real-world image, the second set of features representing locators on the controller depicted in the second real-world image;
determining a pose of the controller using the first set of features and the second set of features, the pose specifying a location of the controller and further specifying a rotational orientation of the controller, wherein determining the pose of the controller comprises:
   identifying a plurality of candidate poses of a virtual model of the controller,
   performing a first set of comparisons between the first set of features in the first real-world image with each of a first plurality of virtual feature sets, each of the first plurality of virtual feature sets associated with one of the candidate poses from the first perspective,
   performing a second set of comparisons between the second set of features in the second real-world image with each of a second plurality of virtual feature sets, each of the second plurality of virtual feature sets associated with one of the candidate poses from the second perspective,
   identifying, based on both the first set of comparisons and the second set of comparisons, one of the plurality of candidate poses of the virtual model as being consistent with both the first set of features in the first real-world image and the second set of features in the second real-world image, and
   determining that the pose of the controller is the identified candidate pose of the virtual model; and
responsive to determining the pose of the controller, performing an action within the virtual environment to update a position and orientation of a virtual object in the virtual environment controlled by the determined pose of the controller.

10. The computer-readable medium of claim 9, the instructions further causing the processor to perform the steps of:
receiving, from an inertial measurement unit (IMU) within the controller, IMU data that includes estimated movement of the controller from its previous position; and
wherein determining the pose of the controller further comprises:
   determining a real-world location of the controller and a real-world rotational orientation of the controller based on the IMU data,
   accessing a plurality of possible poses of the virtual model of the controller, and
   before identifying the plurality of candidate poses, determining that one of the plurality of possible poses is inconsistent with both the real-world location of the controller and the real-world rotational orientation of the controller,
   wherein the inconsistent pose is excluded from being identified as one of the plurality of candidate poses of the virtual model.

11. The computer-readable medium of claim 9, the instructions further causing the processor to perform the step of receiving, from an inertial measurement unit (IMU) within the headset, IMU data that includes estimated movement of the headset from its previous position.

12. The computer-readable medium of claim 9, the instructions further causing the processor to perform the step of retrieving, from an image database, a set of candidate positions of the controller based on the set of features of the controller in the first view and the second view.

13. The computer-readable medium of claim 9, the instructions further causing the processor to perform the step of integrating a velocity vector over time to determine an estimated position of a reference point on at least one of the headset or controller.

14. The computer-readable medium of claim 9, the instructions further causing the processor to perform the step of storing the determined position and movement of the controller along with its associated IMU data in an image database.

15. The computer-readable medium of claim 9, wherein the image tracking system includes one or more cameras, each camera mounted on an arm.

16. The computer-readable medium of claim 9, wherein one or more calibration parameters of the image tracking system, the imaging device on the headset, the IMU on the controller, or the IMU on the headset are adjusted to reduce error in determination of the position of the controller.

\* \* \* \* \*